United States Patent [19]

Chow

[11] 4,123,625
[45] Oct. 31, 1978

[54] DIGITAL REGENERATOR HAVING IMPROVING NOISE IMMUNITY

[75] Inventor: Peter E. K. Chow, Ottawa, Canada

[73] Assignee: Northern Telecom Limited, Montreal, Canada

[21] Appl. No.: 848,301

[22] Filed: Nov. 3, 1977

[51] Int. Cl.² .............................................. H04B 3/36
[52] U.S. Cl. .............................. 179/16 EA; 178/70 R; 179/15 AD; 325/13; 325/38 A; 328/164
[58] Field of Search ..................... 328/164; 333/28 R; 179/15 AD, 15 AN, 16 E, 16 EA, 170 R, 1 P, 1 D; 178/68 R, 70 R, 70 TS; 325/13, 38 A

[56] References Cited

U.S. PATENT DOCUMENTS

| | | | |
|---|---|---|---|
| 2,996,578 | 8/1961 | Andrews, Jr. | 325/38 A |
| 3,261,986 | 7/1966 | Kawashima et al. | 325/13 |
| 3,736,414 | 5/1973 | McAuliffe | 325/38 A |
| 3,798,544 | 3/1974 | Norman | 325/13 |
| 3,924,080 | 12/1975 | Caldwell | 179/15 AD |
| 3,993,953 | 11/1976 | Lender et al. | 325/38 A |
| 4,078,157 | 3/1978 | Lender et al. | 328/164 |
| 4,078,159 | 3/1978 | Lender et al. | 179/16 EA |

Primary Examiner—Kathleen H. Claffy
Assistant Examiner—Randall P. Myers
Attorney, Agent, or Firm—John E. Mowle

[57] ABSTRACT

A digital repeater for the regeneration of partial-response signals having improved noise immunity which basically comprises an equalizer followed by a regenerator. A band limiting filter disposed between the equalizer and regenerator transforms the partial-response signal to a modified form having the same or fewer levels and concurrently reduces the total power of the noise interference. A second filter disposed after the regenerator and having an inverse transfer function replicates the partial-response signal at its output so that the repeater appears transparent to the transmission line.

14 Claims, 12 Drawing Figures

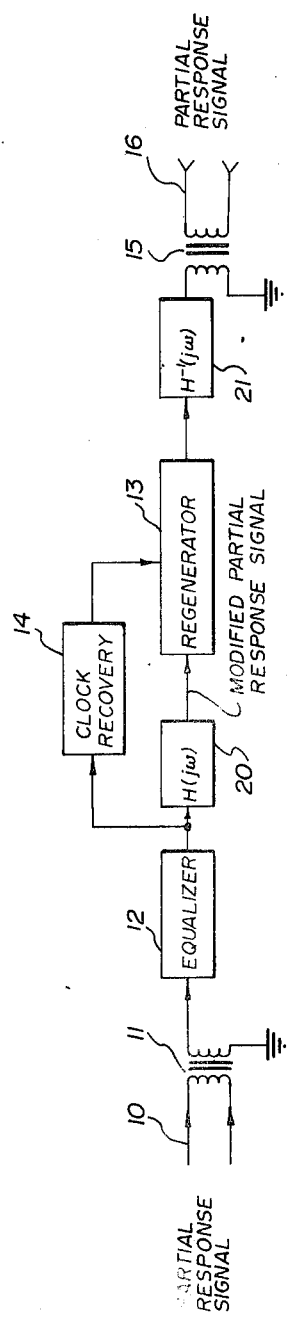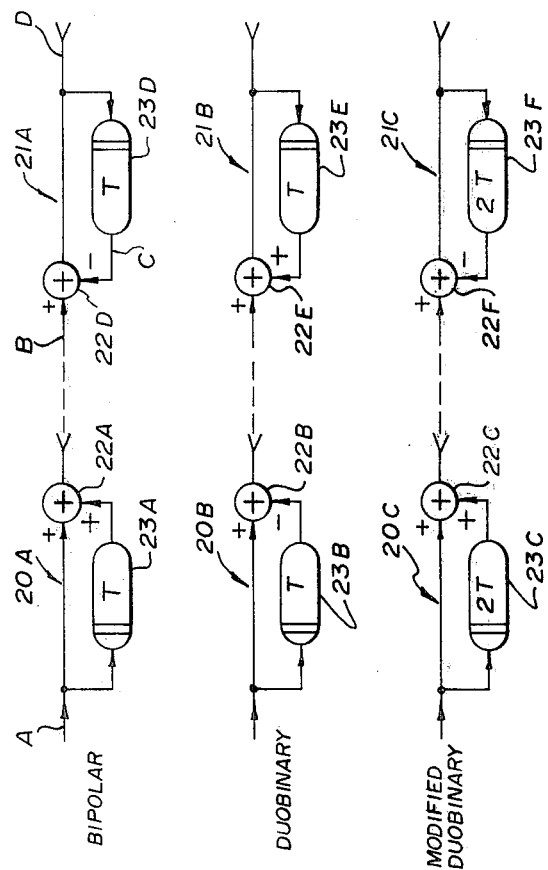

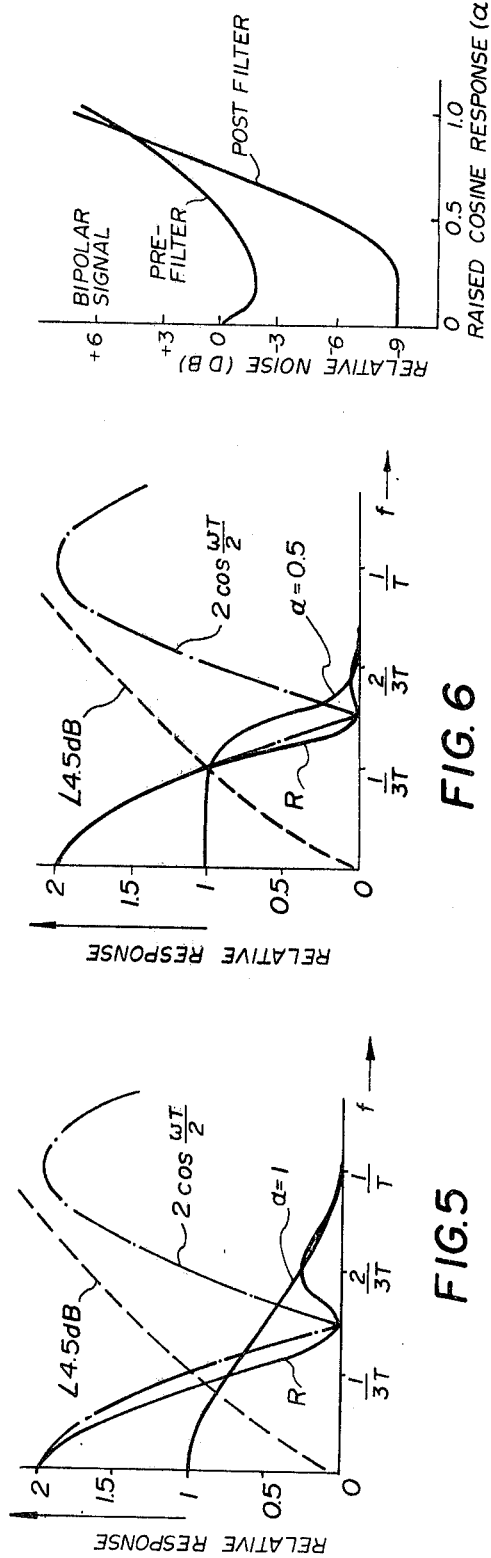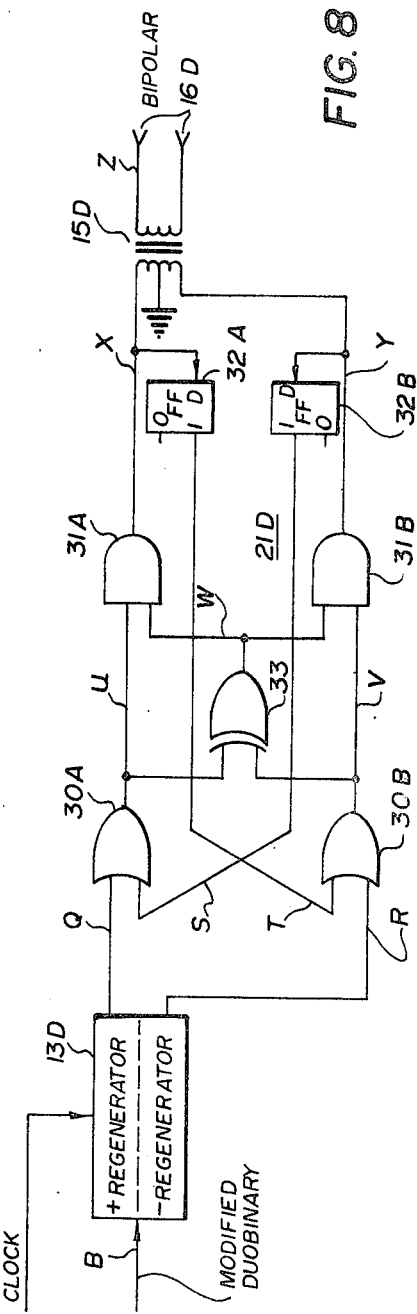

TRUTH TABLE

| FILTER 21A | | | | FILTER 21D | | | | | | | | | |
|---|---|---|---|---|---|---|---|---|---|---|---|---|---|
| B | C | D | | Q | R | S | T | U | V | W | X | Y | Z |
| + | + | 0 | | 1 | 0 | 0 | 1 | 1 | 1 | 0 | 0 | 0 | 0 |
| + | 0 | + | | 1 | 0 | 0 | 0 | 1 | 0 | 1 | 1 | 0 | + |
| + | − | 2+ INVALID | | 1 | 0 | 1 | 0 | 1 | 0 | 1 | 1 | 0 | + |
| 0 | + | − | | 0 | 0 | 0 | 1 | 0 | 1 | 1 | 0 | 1 | − |
| 0 | 0 | 0 | | 0 | 0 | 0 | 0 | 0 | 0 | 0 | 0 | 0 | 0 |
| 0 | − | + | | 0 | 0 | 1 | 0 | 1 | 0 | 1 | 1 | 0 | + |
| − | + | 2− INVALID | | 0 | 1 | 0 | 1 | 0 | 1 | 1 | 0 | 1 | − |
| − | 0 | − | | 0 | 1 | 0 | 0 | 0 | 1 | 1 | 0 | 1 | − |
| − | − | 0 | | 0 | 1 | 1 | 0 | 1 | 1 | 0 | 0 | 0 | 0 |

FIG. 9

| | BIPOLAR SIGNAL |
|---|---|
| A | + 0 − + − 0 + 0 0 0 − + 0 |
| B | X + − 0 0 − + + 0 0 − 0 + |
| Q | X 1 0 0 0 0 1 1 0 0 0 0 1 |
| R | X 0 1 0 0 1 0 0 0 0 1 0 0 |
| S | X 1 0 0 1 0 0 1 0 0 0 0 1 |
| T | X 0 0 1 0 1 0 0 0 0 0 1 0 |
| Z | + 0 − + − 0 + 0 0 0 − + 0 |
| S' | X 1 0 0 0 0 0 1 0 0 0 0 1 |
| T' | X 0 1 0 0 0 1 0 0 0 0 1 0 |
| | ↑ERROR |
| Z' | + 0 0 0 0 − + 0 0 0 − + 0 |
| | ⌣ ERRORS |

FIG. 10

| | BIPOLAR SIGNAL | |
|---|---|---|
| A | 0 + 0 | 0 − 0 |
| B | X + + | X − − |
| Q | 0 1 1 | X 0 0 |
| R | X 0 0 | 0 1 1 |
| M | 1 1 0 | X 0 0 |
| N | X 0 0 | 1 1 0 |
| Z | X X 0 | X X 0 |

FIG. 11

DIGITAL REGENERATOR HAVING IMPROVING NOISE IMMUNITY

This invention relates to a digital regenerator and more particularly to one which provides improved noise immunity (such as to near-end crosstalk) in the transmission of partial-response signals.

BACKGROUND OF THE INVENTION

In a typical digital transmission system, a digital signal is transmitted along a transmission path such as a pair of wires in a telephone cable having digital repeaters periodically interposed which regenerate the signal. Due to the proximity of the wires in the cable, crosstalk interference is generated of which the three most significant types are: near-end crosstalk (NEXT), far-end crosstalk (FEXT) and near-end-near-end interaction crosstalk (NENEIXT). Of these three the most disturbing is generally NEXT which results when high-level regenerated signals are coupled directly into the paths carrying low-level signals in the opposite direction. An interesting discussion on crosstalk interference can be found in a paper entitled: "Engineering T1C Carrier Systems" by J. P. Fitzimmons and W. J. Mayback, Conference Record, ICC 75, June 16–18 San Francisco, Vol.III, pp. 39-5 to 39-9.

In many applications, binary data is transmitted over the cable pairs using ternary partial-response signals such as bipolar, duobinary and modified duobinary signals. References to such systems are "Correlative Level Coding For Binary-Data Transmission" by Adam Lender, IEEE Spectrum, February 1966, pp. 104-115; "Transmission Systems For Communications" 4th Edition by Bell Telephone Laboratories, Inc., pp. 666-673; and "Principles of Data Communication" by R. W. Lucky, J. Salz and E. J. Weldon Jr., McGraw-Hill 1968, pp. 83–92.

The basic form of a digital repeater used to regenerate such a transmitted signal is discussed in an article entitled: "A New 3.152Mb/s Digital Repeater" by A. Anuff et al, Conference Record, ICC 75, June 16-18 San Franciso, Vol.3,pp. 39-10 to 39-13. In such a repeater, the signal is first passed through an equalizer which compensates for the transfer characteristics of the telephone cable. A regenerator then reconstructs the signal in its original form for transmission along the following section of the transmission line.

In many systems, the interfering power density of the noise varies with frequency. For instance in cable circuits, it is well known that NEXT is frequency dependent and usually increases with frequency at 4.5dB/octave rates; ibid BTL text, pp. 286-288. To minimize the NEXT effect, the bandwidth of the equalizer should be as narrow as possible. However, the response of the equalizer has in the past been such as to minimize intersymbol interference thereby restricting its minimum bandwidth. This has frequently led to the use of a raised-cosine transmission characteristic; ibid BTL text, pp. 715-718. In other systems, the power density of the interfering noise may decrease with frequency such as when it is coupled from an adjacent power line. In still other systems, the noise appears only at the band edges. An example of this is the noise which results from interchannel interference in a digital radio system.

STATEMENT OF THE INVENTION

It has been discovered that particular types of noise interference having a power density which varies with frequency, can be decreased by introducing a controlled amount of intersymbol interference in a band limiting filter prior to regeneration of the partial-response signal without increasing the number of signal levels. After regeneration, an inverse function filter can restore the signal to its original form so that the digital repeater may appear transparent to the transmission line.

Thus, the present invention provides an improved regenerating circuit, such as a digital repeater for partial-response signals subject to noise interference having a power density which varies with frequency. The regenerating circuit generally comprises an equalizer for equalizing the transfer characteristics of the incoming transmission line and a regenerator for regenerating the partial-response signals. The improvement comprises a filter located prior to the regenerator to introduce intersymbol interference so as to transform the partial-response signal to a modified partial-response signal having not more than the same number of levels as the received partial-response signal. The system parameters are such that the filter also reduces the total power of the noise interference thereby reducing the error rate of the regenerated signal. If the circuit is functioning as a digital repeater, it will generally include a second filter located after the regenerator and having an inverse characteristic to the first filter so as to restore the signal to its original form. However, the second filter may not be required in all instances, e.g. such as where the signal is demodulated directly from its modified form in an appending receiver. Since the number of signal levels of the modified partial-response signal is the same or fewer than that of the received signal, the filters may be readily added to an existing system with little or no modifications thereto.

In order to achieve better noise immunity, the first filter response must be such as to decrease the overall noise power. Thus, where the power density of the noise increases with frequency (e.g. NEXT or FEXT), the initial filter will in general have a high frequency roll-off characteristic such as obtained from a cosine filter. Conversely, where the power density of the noise decreases with frequency (e.g. power line interference), the initial filter will usually have a low frequency roll-off characteristic such as obtained from a sine filter. Since the initial filter response is dictated by the type of transmitted signal, use of the invention to obtain an improvement is limited to particular types of interference in each case. In all cases, flat or white noise will not benefit from use of the filter, since it will not reduce the overall noise power relative to that of the signal.

To obtain a modified ternary partial-response signal at the output of the first filter, the product $R(j\omega)$, of the partial-response signal's frequency response $S(j\omega)$, and the transfer function of the first filter $H(j\omega)$, is equal to:

$$R(j\omega) = S(j\omega) H(j\omega) = 1 - \epsilon^{-jN\omega iT} \quad (1)$$

$$\text{where: } S(j\omega) = \sum_{n=0}^{N-1} \epsilon^{-jn(\omega iT + a\pi)} \quad (2)$$

$$H(j\omega) = [1 - \epsilon^{-j(\omega iT + a\pi)}] \quad (3)$$

T = pulse repetition period of the partial-response signal, iT = unit delay of each filter tap, N = total number of filter taps, a = 0 or 1.

As stated earlier the invention must be selectively applied in order to obtain improved noise immunity. One important application is to the reduction of NEXT in a cable transmission system using bipolar (or alternate mark inversion (AMI)) signals. However in such a system the improved noise immunity to NEXT will not accrue if the partial-response signal is converted to a binary signal prior to regeneration in the repeater as the required filter would only further emphasize the higher frequency signal energy, as discussed in a paper entitled: "On The Application Of Some Digital Sequences To Communication" by Jack K. Wolf, IEEE Trans. Communications Systems, December 1963, pp. 422-427.

During transmission, a code violation introduced into the system can cause a series of errors to be generated at the output of the second filter. In a particular embodiment of the invention, additional circuitry is included in the second filter to restore the signal to its correct form in response to the detection of preselected pulse sequences in the repeater.

In many applications, ternary partial-response, e.g. bipolar, duobinary and modified duobinary signals, are transmitted. In these embodiments of the invention, a ternary signal is maintained throughout the repeater even though content of the signal is transformed from one type to another due to the intersymbol interference which is first introduced and later removed by the two filters.

BRIEF DESCRIPTION OF THE DRAWINGS

Example embodiments of the invention will now be described with reference to the accompanying drawings in which:

FIG. 1 is a block schematic diagram of a digital repeater;

FIGS. 2, 3 and 4 illustrate schematically the basic form of various filters used in the digital repeater of FIG. 1 for bipolar, duobinary and modified duobinary signals, respectively;

FIGS. 5 and 6 illustrate the effect of the filter shown in FIG. 2, on the transmission response in a bipolar transmission system having a raised-cosine transmission characteristic;

FIG. 7 illustrates the reduction in noise achieved utilizing the filter shown in FIG. 2 for the bipolar transmission system having a raised-cosine transmission characteristic;

FIG. 8 is a schematic diagram of a digital version of a filter for transforming a modified ternary signal back to its original bipolar form for use in the digital repeater of FIG. 1;

FIG. 9 is the truth table for the filters illustrated in FIGS. 2 and 8;

FIG. 10 is an example of how the introduction of a single error into the pulse stream can cause a series of errors to be produced at the output of the digital repeater;

FIG. 11 illustrates the effect of preselected input sequences on the output of the digital filter illustrated in FIG. 12.

DESCRIPTION OF THE PREFERRED EMBODIMENTS

Figure 12:
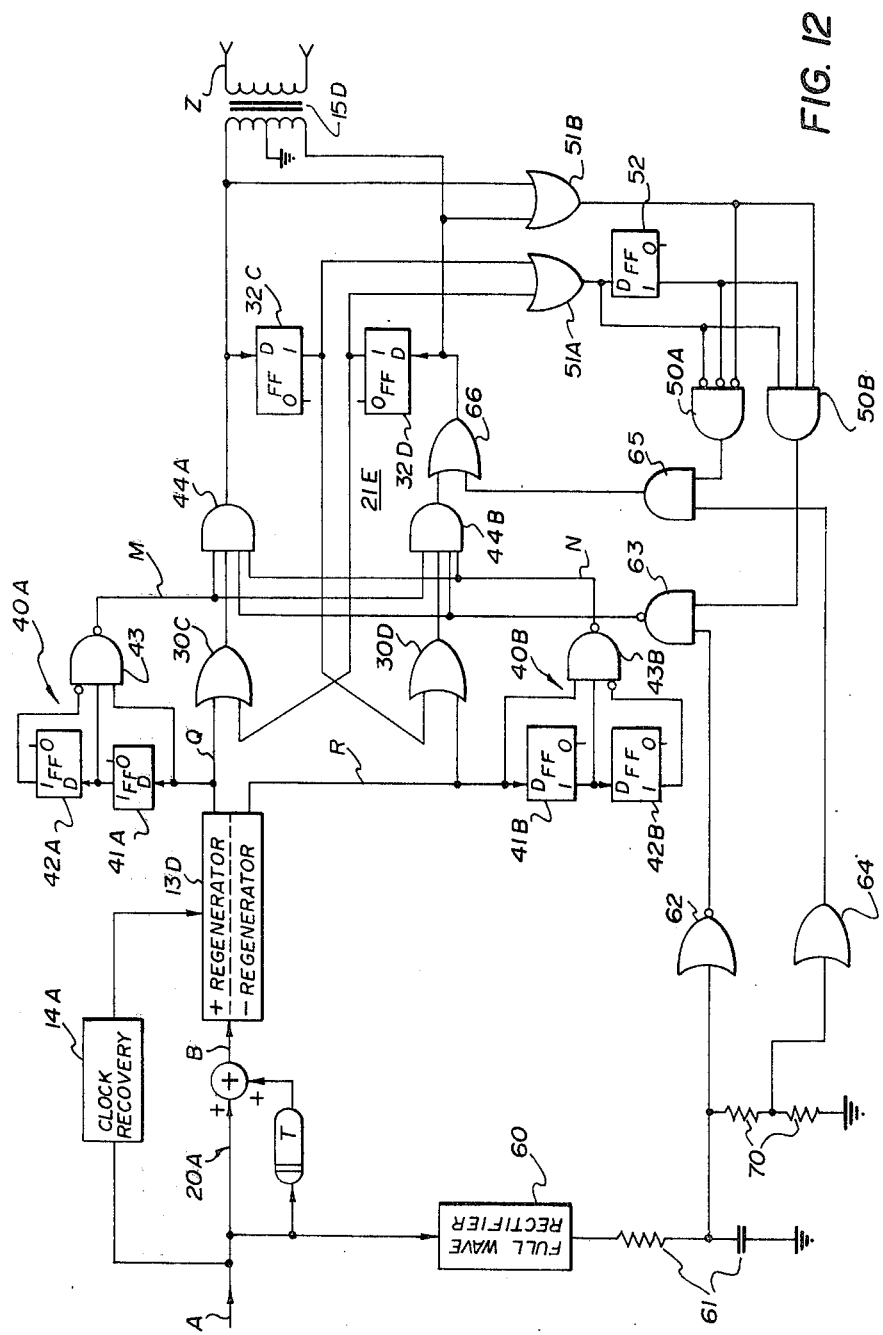
FIG. 12 is an expanded version of the digital filter found in FIG. 8, having additional circuitry for correcting for digital errors introduced in the transmission system.

FIG. 1 illustrates a digital repeater, which is used to regenerate a partial-response signal from a transmission line. In a typical application, the transmission line comprises a pair of wires 10 in a telephone cable which is driven by a signal such as one having a T1 or T1C format, as discussed in a paper entitled: "The T1C System" by J. A. Lombardy et al, Conference Record, ICC 75, June 16-18, San Francisco, Vol.III, pp. 39-1 to 39-4. While various multi-level partial-response signals can be transmitted, one common type is a ternary level bipolar or AMI signal.

Due to the proximity of the wires 10 to others in the telephone cable, various forms of crosstalk are introduced. In addition, the transfer characteristics of the cable pair 10 cause a deterioration in the amplitude and shape of the transmitted pulse signals. Consequently in the repeater, the signal is first coupled from an input transformer 11 to an equalizer 12 prior to regeneration. As is well known, the function of the equalizer is to equalize the transfer characteristics of the cable pair 10. In the prior art, the signal is then coupled to a regenerator 13 which is synchronized by a clock signal derived from a clock recovery circuit 14. Again in the prior art, the output from the regenerator 13 is fed through an output transformer 15 to an on-going section 16 of the transmission line. These circuits are described in considerable detail in the above-mentioned article by A. Anuff et al.

The crux of the present invention is the inclusion of two filters, having inverse characteristics from each other, before and after the regenerator 13. As shown in FIG. 1, a first filter 20 is interposed between the equalizer 12 and the regenerator 13, to introduce a controlled amount of intersymbol interference so as to derive at its output a modified partial-response signal. After regeneration, the modified partial-response signal is then transformed back to its original form by a second filter 21 having an inverse characteristic to the first. In applications such as digital terminals, where it is not necessary to replicate the input signal, the second filter 21 may be eliminated and the signal demodulated directly.

In the following description, elements performing the same function as previously described elements are given the same base number with an added reference character to distinguish between them. In addition corresponding reference characters are used to locate the pulse sequences, shown in FIGS. 9, 10 and 11, in the schematic drawings. FIG. 2 illustrates two basic filter circuits 20A and 21A, for use with a bipolar signal; FIG. 3 filters 20B and 21B for a duobinary signal; and FIG. 4 filters 20C and 21C for a modified duobinary signal. In the first two cases, the incoming signals to the filters 20A and 20B are delayed by an interval T (which is equal to the pulse repetition period of the partial-response signal) before being summed as shown; while in the third case the signal to the filter 20C is delayed by an interval of 2T. Similar delays are found in the inverse filters 21A, 21B and 21C. In all three cases, the signal remains at a ternary level throughout even though transformed by the filters. In the case of the bipolar and duobinary signals, they are both transformed to a modified duobinary form. Functionally each of the filters consists of a delay network 23 and an adder 22 which either sums the signals directly or differentially as indicated, in a well known manner. The actual realization of the filters 20 may however be linear such as achieved using passive components, or digital such as achieved using logic elements. On the other hand the filters 21 will in general be realized using digital techniques otherwise the circuit will tend to oscillate due to the positive feedback required to achieve the transfer functions.

As stated earlier, the total noise power in any one system will be a function of the type of interference and required equalization, thereby limiting any noise improvement achieved by inclusion of the filters 20 and 21 to differing types of interference in different systems. In one such system, the noise improvement achieved by the inclusion of the filters 20A and 21A in the digital repeater can better be illustrated by reference to FIGS. 5, 6 and 7 which illustrate typical results achieved for a bipolar signal. FIGS. 5 and 6 illustrate the response of two channels having different raised-cosine amplitude characteristics. In both figures, the dashed line shows the noise introduced by NEXT increasing at the well known 4.5dB/octave rate. In FIG. 5, the equalized channel response has a 100% raised-cosine amplitude characteristic, $\alpha = 1$; while in FIG. 6 the raised-cosine amplitude characteristic is 50%, $\alpha = 0.5$ (ibid BTL text p. 717).

In both cases, the general transfer function of equation (3) for the filter 20A reduces to:

$$H(j\omega) = (1 - \epsilon^{-j\omega T}) = 2\cos\omega T/2(\epsilon^{-(j\omega T/2)}) \quad (4)$$

which results in a null at a frequency $f = 1/2T$ as shown by the broken lines. In both figures, R is the combined response of the equalized channel and the filter 20A, thus:

$$R = f(\alpha) \, 2\cos(\omega T/2)(\epsilon^{-(j\omega T/2)}) \quad (5)$$

It can be seen that in both instances, the resultant R falls below that of the equalized channels (i.e. curves $\alpha = 1$ and $\alpha = 0.5$) between the frequencies $1/(3T)$ and $2/(3T)$ which results in less noise contribution over this portion of the frequency spectrum. Outside this band however, there is an increased noise contribution. If the noise contributed by crosstalk were flat with frequency, the inclusion of the filter 20A would have a detrimental affect on the overall system performance. However, because of the noise contributed by NEXT which rises at a 4.5dB/octave rate (as shown in FIGS. 5 and 6) and of the high frequency gain in the equalizer 12, the overall result is that an improvement in noise immunity to NEXT can be obtained by introduction of the filter, for most raised-cosine characteristics of the channel response. While not shown in FIGS. 5 and 6, the response of filter 21A is an inverse characteristic to that of filter 20A thus:

$$H^{-1}(j\omega) = 1/(1 - \epsilon^{-j\omega T}) = \frac{1}{2}\sec\omega T/2(\epsilon^{(j\omega T/2)}) \quad (6)$$

FIG. 7 illustrates the relative NEXT noise for differing raised-cosine channel response characteristics before and after the filter 20A. The graph shows that the prefilter NEXT noise is a minimum at $\alpha \simeq 0.22$. For values of $\alpha < 0.92$, some noise reduction can be obtained as a result of the introduction of the filter, ranging up to 9dB as $\alpha \rightarrow 0$. The small post-filter increase in noise when $\alpha > 0.92$ results from the very high contribution of NEXT noise introduced at frequencies greater than $2/(3T)$ as shown in FIG. 5. However, with lower values of $\alpha$, the channel response characteristic is such that the higher frequency noise is cut off as shown in FIG. 6. Note in FIG. 5, R is significantly greater than $\alpha$ between $2/(3T) < f < 1/T$; while in FIG. 6, R is only marginally greater than $\alpha$ between $2/(3T) < f < 3/(4T)$. In practice, an $\alpha < 0.5$ is not readily achieved and consequently a realistic reduction in crosstalk noise is in the order of 5.5dB. However, due to the nature of a digital signal, this causes a marked decrease in the error rate of the regenerated signal.

The filters illustrated in FIGS. 2, 3 and 4 will provide a perfect replica of the signal at the output of the digital repeater providing no code violations develop in the regenerated signal. However, such violations occur in a practical system and are due to such factors as noise, distortion and start-up conditions. Due to the intersymbol interference generated by the filters a single code violation can result in a series of errors being transmitted further along the system. In addition to this, the positive and negative pulses of a ternary level signal are usually generated in separate channels which are then combined at the output as illustrated in the above-mentioned paper by A. Anuff et al.

A digital realization of the equivalent filter 21A shown in FIG. 2, which uses a split output from the regenerator 13, is illustrated in FIG. 8 in conjunction with the truth table of FIG. 9. This example is for the case where the filters have a delay T (i.e. N = 2, equation (2)). The bipolar signal which is transformed by the first filter 20A to a modified duobinary signal B, is split into + and − digits at the output of the regenerator 13D, and fed to the input of the filter 21D. The basic filter 21D comprises two OR gates 30A and 30B, two AND gates 31A and 31B, two flip-flops 32A and 32B, and an exclusive OR gate 33 connected as shown. The flip-flops 32A and 32B provide the delay period T. The outputs are combined in the primary of the transformer 15D to provide a reconstructed bipolar signal for transmission along the line 16D.

FIG. 9 compares the truth table for both filters 21A (FIG. 2) and 21D (FIG. 8), and except for the invalid words, the outputs D and Z are identical. With filter 21A the introduction of an error during start-up or by the regenerator 13 results in an invalid output (i.e. 2+ or 2−). However, with filter 21D, an error at one of the inputs Q or R results in a continuous stream of errors at the output Z until a + − or − + sequence occurs at the output of the regenerator.

An example of this is shown in FIG. 10 where it is evident from the bipolar signal patterns that a series of errors at output Z will be transmitted as a result of a single error occurring in either pulse streams S' or T' (in this example the error is in T'). While the initial error cannot be corrected, the number of such errors which occur before the correct bipolar signal is again reestablished, can be limited by the inclusion of additional circuitry which forces the output to a particular value whenever certain input sequences occur. This is achieved for several different input sequences of a bipolar signal in the circuit shown in FIG. 12, which is an alternate embodiment of the circuit shown in FIG. 8. Here in addition to the basic elements described in the previous embodiment bearing identical reference numerals, the circuit of FIG. 12 includes two logic networks 40A and 40B each consisting of two flip-flops 41, 42 and a NAND gate 43. It can be readily shown that the unique sequence X + + or X − − occurs at the output B of the first filter 20A whenever the bipolar input signal A is 0 + 0 or 0 − 0 respectively where X is a different level than the latter two levels of each sequence. This results in the sequence of pulses shown in FIG. 11 at the indicated points in the filters 20A and 21E. Such a sequence can be used to advantage to correct any errors which may have been introduced by forcing a 0 at output Z from the repeater, simultaneously with the last digit of either of these sequences. This is achieved by the networks 40A or 40B, which in response to detection of these sequences inhibit the AND gates 44A and 44B thereby forcing a 0 at the output Z.

A second property of the bipolar signal A is that when there are several consecutive logical 0's or 1's the input energy must be low or high respectively. This information can be used to add an additional correction factor to the digital signal. AND gates 50A and 50B in conjunction with OR gates 51A and 51B and flip-flop 52 provide an output whenever there are three consecutive logical 0's or 1's respectively just prior to the output Z. To determine the energy level of the incoming bipolar signal A, it is rectified and filtered in full-wave rectifier 60 and R-C filter 61. When the signal energy level is very low there is an output from NOR gate 62. If however, there is a simultaneous output from AND gate 50B, it indicates there is an error in the output signal of the digital repeater. The simultaneous outputs from gates 50B and 62 produces a logical 0 at the output of NAND gate 63 which in turn, by way of AND gates 44A and 44B, forces a 0 at the output Z of the digital repeater. Similarly, when the incoming signal energy level is high an output is obtained from OR gate 64 driven from the resistive divider 70. Again however, if there is a simultaneous output from AND gate 50A, an error is indicated which then produces an output from AND gate 65 thereby forcing a − pulse at the output Z of the digital repeater through OR gate 66. It is to be noted that the bipolar sequence will be reestablished by the insertion of a + or − pulse at the output. Hence the OR gate 66 can be placed in series with either of the outputs of AND gates 44A or 44B.

While the concept of forcing a particular output pulse, in response to the detection of particular sequences of pulses in the repeater, is shown only for the bipolar case, it is evident that similar techniques could be applied to other partial-response signals and in particular ternary level signals such as duobinary and modified duobinary signals.

What is claimed is:

1. In a digital repeater for regenerating a partial-response signal from a transmission line, the signal being subject to noise interference having a power density which varies with frequency, said repeater comprising:
    an equalizer responsive to the signal from the transmission line for equalizing the transfer characteristics of the transmission line; and
    a regenerator responsive to the output of the equalizer for regenerating said partial-response signal; the improvement comprising:
    a first filter disposed between the equalizer and the regenerator to introduce intersymbol interference so as to transform the partial-response signal to a ternary partial-response signal, in which the product $R(j\omega)$ of frequency characteristic of the partial-response signal $S(j\omega)$ and the transfer function of the first filter $H(j\omega)$ is equal to:

$$R(j\omega) = S(j\omega) H(j\omega) = 1 - \epsilon^{-jN\omega iT}$$

where:
$T$ = pulse repetition period of the partial-response signal,
$iT$ = unit delay of each filter tap,
$N$ = total number of filter taps,
said first filter band-limiting the overall power of the noise interference; and
a second filter disposed between the regenerator and the output of the digital repeater having a transfer function which is the inverse of said first filter so as to derive a replica of said partial-response signal at the output thereof.

2. A digital repeater as defined in claim 1 in which the equalized channel response has a raised-cosine frequency characteristic.

3. A digital repeater as defined in clAim 2 in which:

$$S(j\omega) = \sum_{n=0}^{N-1} \epsilon^{-jn(\omega iT + a\pi)}$$

$$H(j\omega) = [1 - \epsilon^{-j(\omega iT + a\pi)}]$$

where: $a = 0$ or $1$

4. A digital repeater as defined in claim 3 in which the second filter additionally comprises:
    logic circuitry for forcing a digit of preselected magnitude and polarity at the output of the second filter in response to the detection of a predetermined sequence of digits in the repeater.

5. In a digital repeater for regenerating a partial-response signal from a transmission line, the signal being subject to noise interference having a power density which varies with frequency, said repeater comprising:
    an equalizer responsive to the signal from the transmission line for equalizing the transfer characteristics of the transmission line; and
    a regenerator responsive to the output of the equalizer for regenerating said partial-response signal; the improvement comprising:
    a first filter, disposed between the equalizer and the regenerator, to band limit the overall power of the noise interference, and to introduce intersymbol interference so as to transform the partial-response signal to a modified partial-response signal having the same or fewer levels; and
    a second filter disposed betwen the regenerator and the output of the digital repeater having a transfer function which is the inverse of said first filter so as to derive a replica of said partial-response signal at the output thereof.

6. A digital repeater as defined in claim 5 in which the partial-response signal and the modified partial-response signal are both ternary level.

7. A digital repeater as defined in claim 6 in which the channel response has a raised-cosine amplitude characteristic.

8. A digital repeater as defined in claim 7 in which the second filter additionally comprises:
    logic circuitry for forcing a pulse of preselected magnitude and polarity at the output of the second filter in response to the detection of a predetermined sequence of pulses in the repeater.

9. In a digital repeater for regenerating a partial-response signal, subject to noise interference having a power density which varies with frequency, said repeater comprising:
 a regenerator for regenerating said partial-response signal;
 the improvement comprising:
 a first filter disposed between the input of the digital repeater and the regenerator to introduce intersymbol interference so as to transform the partial-response signal to a modified partial-response signal having not more than the same number of levels, the filter reducing the overall power of the noise interference; and
 a second filter disposed between the regenerator and the output of the digital repeater having a transfer function which is the inverse of said first filter so as to derive a replica of said partial-response signal at the output thereof.

10. A digital repeater as defined in claim 9 in which the partial-response signal and the modified partial-response signal are both ternary level.

11. In a regenerating circuit for regenerating a partial-response signal, subject to noise interference having a power density which varies with frequency, said circuit comprising:
 a regenerator for regenerating said partial-response signal;
 the improvement comprising:
 a filter disposed between the input of the circuit and the regenerator for introducing intersymbol interference so as to transform the partial-response signal to a modified partial-response signal having not more than the same number of levels, the filter reducing the power of the noise interference.

12. In a digital repeater for regenerating a bipolar signal received from a transmission line, the signal being subject to near-end crosstalk interference, said repeater comprising:
 an equalizer responsive to the signal from the transmission line for equalizing the transfer characteristics of the transmission line to obtain a channel response having a raised-cosine amplitude characteristic: and
 a regenerator responsive to the output of the equalizer for regenerating the signal coupled thereto;
 the improvement comprising:
 a first filter disposed between the equalizer and regenerator and having a transfer function;

$$H(j\omega) = 2 \cos \omega T/2 (\epsilon^{-(j\omega T/2)})$$

where: T = pulse repetition rate of the bipolar signal;
 so as to introduce intersymbol interference and transform the bipolar signal to a modified duobinary signal, and so as to reduce the overall power of the near-end crosstalk from the transmission line; and
 a second filter disposed between the regenerator and the output of the digital repeater having a transfer funcion:

$$H^{-1}(j\omega) = \tfrac{1}{2}\sec\omega T/2 \, (\epsilon^{(\omega T/2)})$$

so as to derive a replica of said bipolar signal at the outuput thereof.

13. A digital repeater as defined in claim 12 in which the second filter is a digital filter and additionally includes:
 logic circuitry for forcing a logical 0 at the digital filter output concurrently with the detection of the third digit of either of the sequences X + + or X − − at the input to the second filter where X is a different level than the latter two levels of each sequence.

14. A digital repeater as defined in claim 13 in which the second filter includes additional logic circuitry for forcing a logical 0 or 1 at the digital filter output in response to the detection of at least three consecutive logical 0's or 1's respectively, at the input to the first filter.

* * * * *